United States Patent [19]

Mason

[11] E Patent Number: Re. 32,804

[45] Reissued Date of Patent: Dec. 20, 1988

[54] WORKPIECE TRANSFER

[75] Inventor: Arthur C. Mason, Warren, Mich.

[73] Assignee: Lamb Technicon Corp., Warren, Mich.

[21] Appl. No.: 134,501

[22] Filed: Dec. 18, 1987

Related U.S. Patent Documents

Reissue of:

[64] Patent No.: 4,669,607
Issued: Jun. 2, 1987
Appl. No.: 764,224
Filed: Aug. 9, 1985

[51] Int. Cl.[4] ..... B65G 25/02

[52] U.S. Cl. ..... 198/774; 198/468.6; 414/750; 74/103

[58] Field of Search ..... 198/774, 468.6; 414/749-752, 905; 74/96, 103, 105, 436, 820, 27

[56] References Cited

U.S. PATENT DOCUMENTS

| | | | |
|---|---|---|---|
| 3,187,883 | 6/1965 | Umbricht | 198/774 |
| 3,789,676 | 2/1974 | Brems | 74/27 |
| 3,885,680 | 5/1975 | Rasenberger | 198/774 X |
| 4,236,421 | 12/1980 | Baba | 74/436 X |
| 4,538,721 | 9/1985 | Westman | 198/774 |

FOREIGN PATENT DOCUMENTS

| | | | |
|---|---|---|---|
| 2036023 | 2/1972 | Fed. Rep. of Germany | 198/774 |

OTHER PUBLICATIONS

Nicholas P. Chironis, Mechanisms, Linkages, and Mechanical Controls, pp. 72-75, McGraw-Hill Book Co., 1965.

*Primary Examiner*—Robert J. Spar
*Assistant Examiner*—Lyle Kimms
*Attorney, Agent, or Firm*—Barnes, Kisselle, Raisch, Whittemore & Hulbert

[57] ABSTRACT

A multiple station conveyor having a lift and carry shuttle to advance workpieces. To permit a normal work height for the workpieces when in the stations while providing a relatively long vertical stroke for the shuttle it is raised and lowered by Scott Russell lift mechanisms disposed beside and laterally outside of the shuttle.

27 Claims, 5 Drawing Sheets

WORKPIECE TRANSFER

Matter enclosed in heavy brackets [ ] appears in the original patent but forms no part of this reissue specification; matter printed in italics indicates the additions made by reissue.

FIELD

This invention relates to workpiece processing lines having multiple stations and more particularly to a transfer mechanism for moving workpieces from one station to another.

BACKGROUND

Various devices are known which have multiple work stations with workpieces received on locators therein and a mechanism for lifting and carrying workpieces from one station to another. Usually, a shuttle underlies all the workpieces and is raised and lowered generally vertically by elevators underlying the shuttle. The elevators are usually actuated by a drive mechanism underlying the shuttle which in operation raises the elevators and hence the shuttle to lift the workpieces generally vertically above the locators whereupon the shuttle is actuated to advance the workpieces and then the elevators are lowered to move the shuttle generally vertically downward to deposit the advanced workpieces in the work stations. After the shuttle is lowered sufficiently to disengage and clear the workpieces, it is retracted.

For many workpiece configurations to clear the locators when lifted and the shuttle when lowered long vertical strokes of the elevators are necessary. This necessity for long vertical strokes results in excessive vertical height above the floor of the workpieces when deposited on the locators in the stations, instability of the shuttle and workpieces when raised, and difficulty in synchronizing the movement of all of the elevators and synchronizing movement of the elevators with the shuttle. Moreover, since the elevators and drive mechanism are disposed under the workpieces, they are highly susceptible to becoming contaminated and malfunctioning due to dirt, chips and the like falling off the workpieces and dropping onto the mechanism.

SUMMARY

A workpiece transfer apparatus having multiple stations, generally vertical lifts and a generally horizontal shuttle. To provide a normal working height for the workpieces when located in the stations along with a relatively long vertical travel so that the workpieces can be advanced by the shuttle, the shuttle is raised and lowered by Scott Russell linkage mechanisms disposed outboard of the shuttle so that when fully lowered it can pass between the lift mechanisms. Preferably, the shuttle is also supported and stabilized by the Scott Russell mechanisms.

Some of the objects, features and advantages of this invention are to provide a workpiece transfer in which workpieces are received and located at a convenient working height in the stations while providing a relatively long vertical travel of the workpieces, the movements of the vertical lifts are easily and precisely synchronized, when raised the workpieces and lifts are extremely stable, the lifts are not susceptible to becoming contaminated and malfunctioning by dirt and debris dropping from the workpieces, and which is rugged, durable, reliable, relatively service and maintenance-free, of relatively simple design and construction and of economical manufacture and assembly.

BRIEF DESCRIPTION OF THE DRAWINGS

These and other objects, features and advantages of this invention will be apparent from the following detailed description, appended claims and accompanying drawings in which:

PRIOR ART TRANSFER

Figure 2:
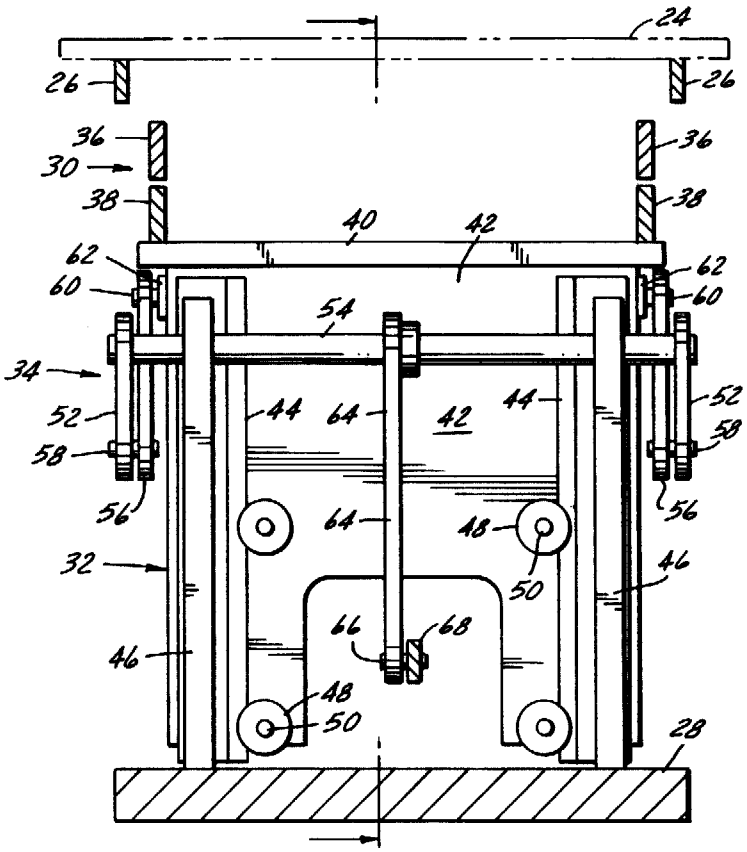
FIG. 2 PRIOR ART
FIG. 2 is a sectional view taken generally on line 2—2 of FIG. 1.
Figure 3:
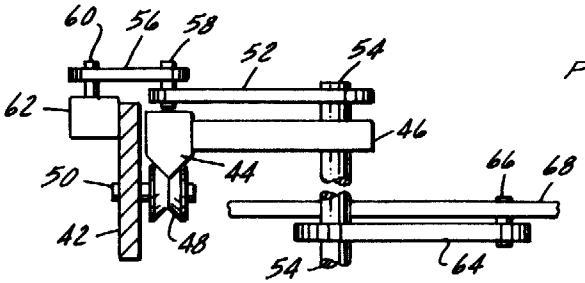
FIG. 3 PRIOR ART
FIG. 3 is a fragmentary sectional view taken generally on line 3—3 of FIG. 1.
Figure 1:
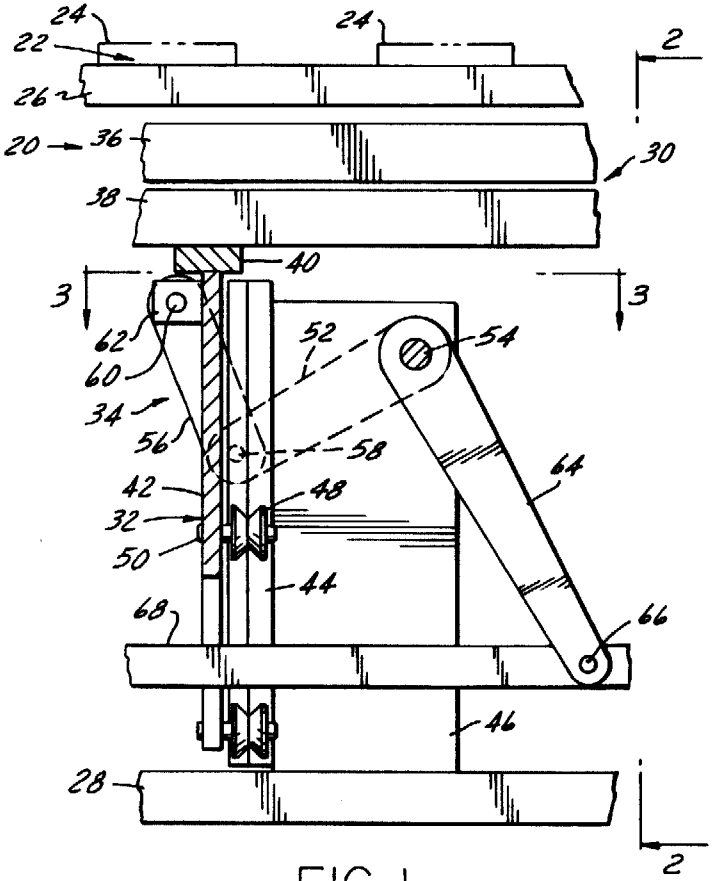
FIG. 1 PRIOR ART
FIG. 1 is a fragmentary side view of a prior art transfer mechanism.

FIGS. 1-3 illustrate a prior art workpiece transfer device 20 having multiple work stations 22 in which workpieces 24 are received on support rails 26 fixed to and carried by a base 28. The workpieces are advanced generally horizontally by a shuttle mechanism 30 carried by at least two longitudinally spaced apart elevators 32 (only one of which is shown) fixed to the base 28. The elevators are vertically raised and lowered by link mechanisms 34 driven by a prime mover (not shown).

The shuttle has a pair of laterally spaced apart workpiece carrier rails 36, each of which is mounted for reciprocation along an underlying support rail 38 fixed to a mounting plate 40 of the elevators for vertical movement therewith. When the elevators are raised, the carrier rails 36 are extended generally horizontally in one direction by a drive mechanism (not shown) to advance the workpieces, and when the elevators are fully lowered the carrier rails are retracted by the drive mechanism to return them to their starting position.

Each elevator has a slide plate 42 mounted to be reciprocated generally vertically on a pair of laterally spaced apart V-shape ways 44 each secured to an upright support 46 fixed to the base. The slide plates are reciprocably mounted on the ways by four rollers 48, each journalled for rotation on a stub shaft 50 secured to the plate and having a V-shape groove engagable with a complementary portion of one of the ways.

The mechanism 34 for moving each slide plate 44 has a pair of laterally spaced apart levers 52 each fixed at one end to a shaft 54 journalled for rotation in the supports 46 and connected by a link 56 to the slide plate. Each link 56 is pivotally connected adjacent one end at 58 to an associated lever 52 and at the other end to the slide plate by a pivot pin 60 carried by a block 62 fixed to the slide plate. Each shaft 54 is turned by an arm 64 which is fixed adjacent one end to the shaft and pivotally connected adjacent the other end at 66 to a drag link 68 so that movement of the drag link simultaneously activates all the drive mechanisms 34 to simultaneously raise or lower all the elevators. The drag link is powered by a drive mechanism not shown.

It is apparent that with this prior art transfer 20, if the configuration of the workpieces is such that a long vertical stroke of the elevators is necessary, the workpieces will be so high above the floor or base of the transfer that they are above a convenient work height for manufacturing and assembly operations. Moreover, the workpieces and elevators will be so high they are unstable. Furthermore, dirt and debris dropping from the workpieces will fall upon and contaminate the underlying elevators 32 and drive mechanisms 34 which increases their service and maintenance requirements and eventually causes them to malfunction.

PREFERRED EMBODIMENT

Figure 4:
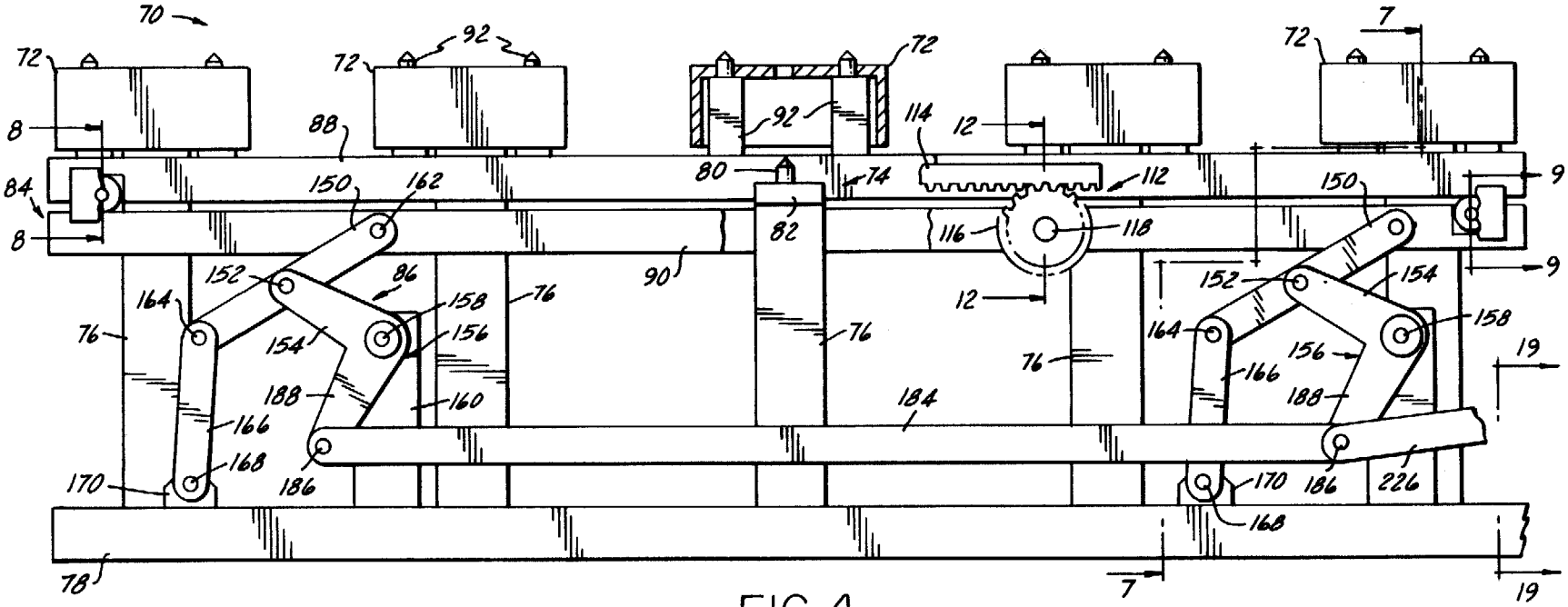
FIG. 4 is a side view with portions broken away of a multiple station conveyor embodying this invention with a shuttle and the workpieces carried thereby shown in the fully raised position.

FIGS. 4–7 illustrate a high lift conveyor 70 embodying this invention. Workpieces 72 are received in a plurality of work stations 74, each having a workpiece support 76 fixed to a base 78 of the conveyor. Each workpiece is accurately positioned on a support by locator pins 80 projecting through holes in the workpiece and fixed to a rest pad 82. When the workpieces are fully raised from the supports as shown in FIG. 4, they are transferred or advanced generally horizontally by a shuttle assembly 84. The shuttle is raised and lowered generally vertically by lift mechanisms 86. Preferably, the shuttle is also carried and supported by only the lifts.

SHUTTLE

The shuttle 84 has a pair of laterally spaced apart workpiece carrier rails 88 which underlie the workpieces and are mounted to reciprocate on underlying laterally spaced apart support tracks or rails 90. When the shuttle is raised, the workpieces are received on locator and support pins 92 fixed to the carrier rails as shown in FIG. 4.

Figure 8:
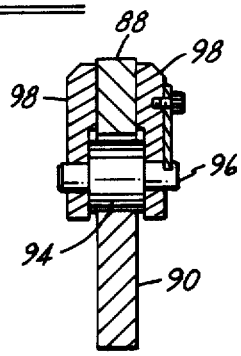
FIG. 8 is a sectional view taken generally on line 8—8 of FIG. 4 and illustrating a support roller and rails of the shuttle.
Figure 9:
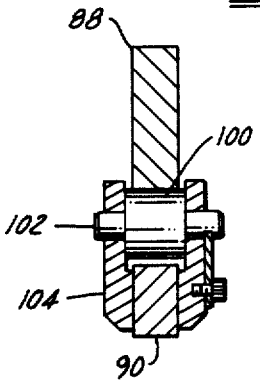
FIG. 9 is a sectional view taken generally on line 9—9 of FIG. 4 and illustrating another support roller and the rails of the shuttle.
Figure 10:
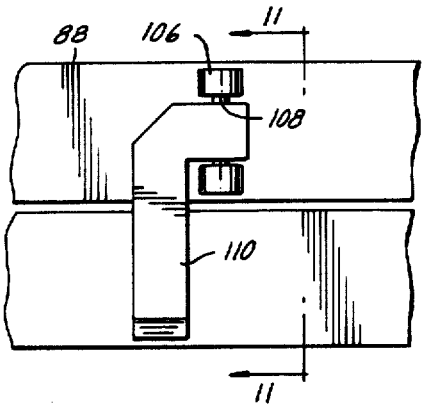
FIG. 10 is an enlarged and fragmentary side view of the shuttle rails and guide rollers of the conveyor of FIG. 4.
Figure 11:
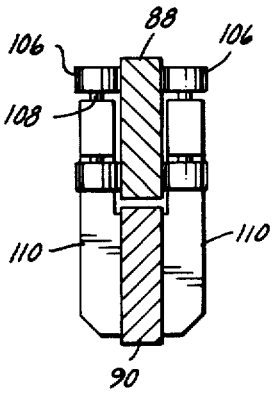
FIG. 11 is a sectional view taken generally on line 11—11 of FIG. 10.

As shown in FIGS. 4 and 8, adjacent one end each workpiece carrier rail 88 rides on its associated track 90 through a roller 94 journalled on a pin 96 carried by brackets 98 secured to the carrier rail. As shown in FIG. 4 and 9 adjacent the other end, each shuttle rail is supported on its underlying track by a roller 100 journalled on a pin 102 carried by brackets 104 secured to the track. As shown in FIGS. 10 and 11, each carrier rail 88 is also retained in its upright position by at least two longitudinally spaced apart pairs of rollers 106 secured to a shaft 108 journalled in brackets 110 secured in opposed relation to their associated track 90.

Figure 12:
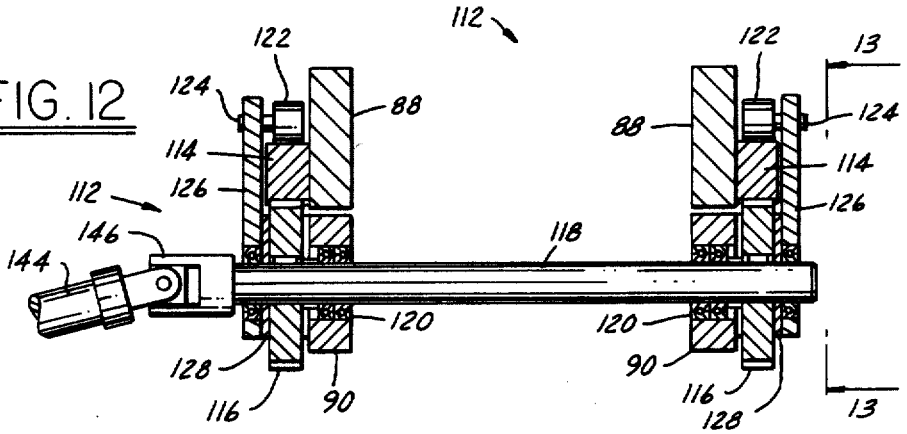
FIG. 12 is a sectional view taken generally on line 12—12 of FIG. 4 and illustrating a mechanism for driving the shuttle.
Figure 13:
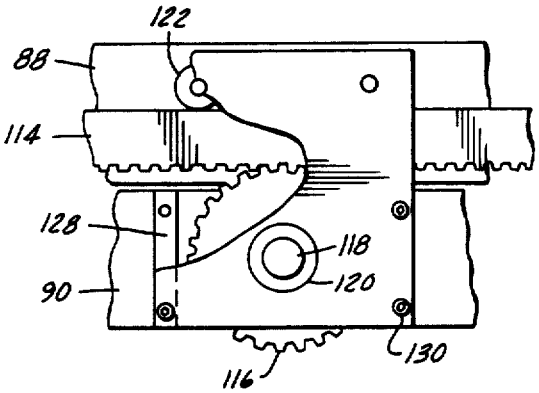
FIG. 13 is a fragmentary side view taken generally on line 13—13 of FIG. 12.

As shown in FIGS. 4 and 12, the carrier rails 88 of the shuttle are reciprocated in unison by a drive 112 having a rack 114 fixed to each rail which meshes with a gear 116 keyed to a driven shaft 118 journalled for rotation by bearings 120 carried by the tracks 90. As shown in FIGS. 12 and 13 each rack 114 is retained in meshed relationship with its associated gear 116 by a pair of rollers 122 each journalled on a stub shaft 124 secured to a carrier plate 126 which along with spacer bars 128 is secured by cap screws 130 to its associated shuttle track 88.

Figure 14:
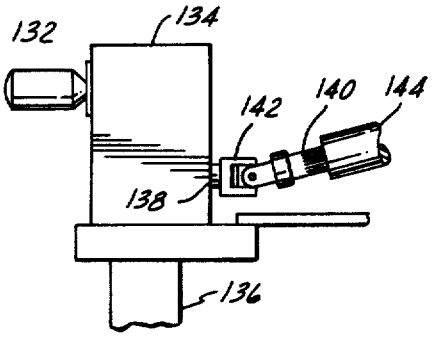
FIG. 14 is a fragmentary side view of a drive for the shuttle.

As shown in FIG. 14, the drive 112 is driven by a reversible electric motor 132 through a speed reducer gear box 134 secured to a pedestal 136 fixed to the base 78 of the conveyor. The output shaft 138 of the gear box is connected to the driven shaft 118 while still permitting the shuttle to be raised or lowered. This is accomplished by a spline 140 connected by a universal joint 142 to the output shaft 138 and slidably received in a mating splined coupling tube 144 connected by a universal joint 146 to the shaft 118 which rotates the gears 116 meshed with the racks 114. The shaft 118 is rotated in one direction (clockwise as viewed in FIG. 4) to extend the carrier rails 88 of the shuttle and in the opposite direction, to retract the carrier rails.

LIFTS

Figure 6:
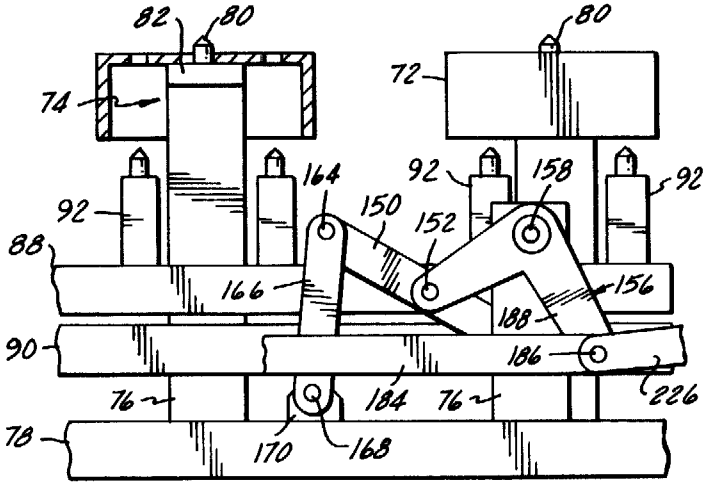
FIG. 6 is a partial side view of the conveyor with the shuttle in the fully lowered position and the workpieces received on the locators in the stations.

In accordance with one feature of this invention, the shuttle 84 is raised and lowered with a relatively long generally vertical stroke by at least two longitudinally spaced apart lift mechanisms 86 (FIG. 4–7) disposed on each side of and laterally outside the shuttle so that, as shown in FIG. 6, when fully lowered the shuttle is between the lifts. Each lift 86 is preferably a modified Scott Russell mechanism which provides a substantially straight line motion. Each lift has a long link 150 pivotally connected at substantially its midpoint 152 to one end of a short link 154, which preferably is one arm of a bell crank 156 mounted on a fixed pivot 158 secured to a support 160 fixed to the base 78. Adjacent one end the long link 150 is pivotally connected at 162 to its associated rail 90 of the shuttle and adjacent the other end pivotally connected at 164 to one end of a fulcrum link 166. Link 166 is free to oscillate about a fixed pivot 168 adjacent the other end which is secured in a mounting block 170 fixed to the base.

To produce a substantially straight line motion, the short link 154 of the bell crank is substantially one-half the length of the long link 150 and is connected to the long link at substantially its midpoint. The vertical motion of the shuttle will be closer to a true straight line the longer the length of the fulcrum link 166. Preferably, the length of the link 166 is greater than one-half the length of the long link 150. The fixed pivot 170 of the fulcrum link 166 should be located so that when the link is in the midposition of its oscillation it is substantially perpendicular to the long link 150 when in the midpoint of its vertical travel.

Figure 15:
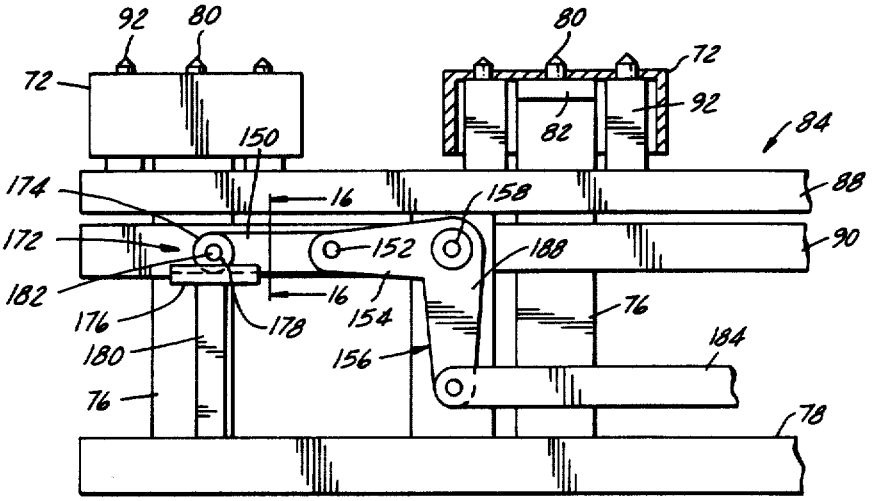
FIG. 15 is a fragmentary side view of the conveyor similar to FIG. 5 and showing a modified form of the lifts for the shuttle.
Figure 16:
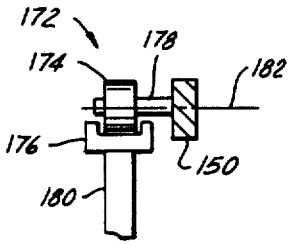
FIG. 16 is a fragmentary sectional view taken generally on line 16—16 of FIG. 15.

If a true straight line vertical motion is desired, the fulcrum link can be eliminated and replaced by a fulcrum guide assembly 172. As shown in FIGS. 15 and 16, this assembly has a follower roller 174 received in a guide track 176 and journalled on a pin 178 fixed to the long link 150. The guide track is fixed to an upright support 180 fixed to the base. The follower and guide track cause the pivot point 182 of the long arm to move along a straight line path perpendicular to the line of the vertical motion of the pivot 162 of the long link and intersecting the axis of the fixed pivot 158 of the short arm 154.

Figure 17:
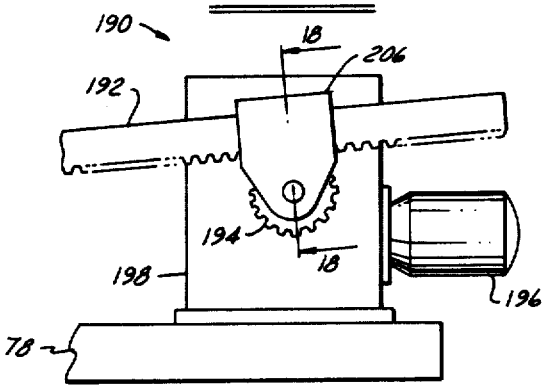
FIG. 17 is a fragmentary side view illustrating a drive for the lifts.
Figure 18:
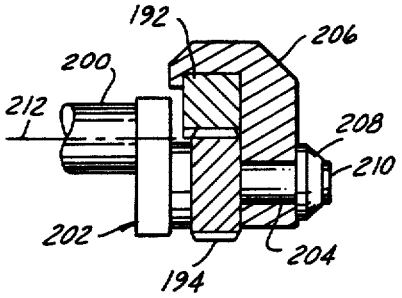
FIG. 18 is a sectional view taken generally on line 18—18 of FIG. 17.

As shown in FIG. 4, all of the lifts 86 associated with each rail 90 of the shuttle are actuated through a common drag link 184 pivotally connected at 186 to the other arm 188 of each associated bell crank 156. All of the lifts are powered simultaneously and in unison by a drive 190 shown in FIG. 17. Drive 190 has a rack 192 meshed with a drive gear 194 driven by a reversible electric motor 196 through a speed reducer gear box 198 mounted on the base 78 of the conveyor. As shown in FIG. 18, the drive gear 194 is connected to the output shaft 200 of the gear box through a crank 202 having a journal 204 on which the gear is keyed for rotation with the crank on an axis which is eccentric to the axis of the output shaft. The rack 192 is held in mesh with the gear 194 by a hooked retainer 206 which is also mounted for rotation on the journal 204 and retained thereon by a washer 208 and a bolt 210 threaded into the end of the journal.

So that when the crank 202 makes one complete revolution, the rack 192 will be moved an increment or a distance equal to the pitch circumference of the drive gear 194 and the profile of the instantaneous speed or volocity of the rack 192 will be cycloidal or an accelerating and decelerating motion with a dwell at each end of the increment, the throw of the crank 202 is such that the axis 212 of the output shaft 200 is substantially in line with or intersects the pitch line of the drive gear 194.

Figure 19:
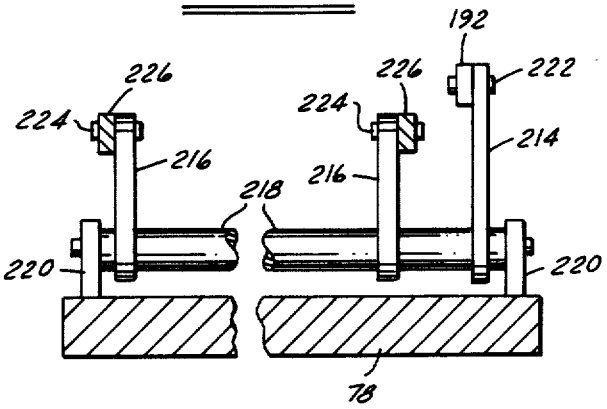
FIG. 19 is a fragmentary sectional view taken generally on line 19—19 of FIG. 4 and illustrating the linkage connecting the lifts with the drive.

The rack 192 of the drive 190 is operably connected to all the lifts 86 through levers 214 and 216 (FIG. 19), each fixed at one end to a common shaft 218 journalled in supports 220 fixed to the base 78 of the conveyor. The lever 214 adjacent its other end is pivotally connected at 222 to one end of the rack 192. Each lever 216 adjacent its other end is pivotally connected at 224 to the one end of a link 226 which is pivotally connected adjacent its other end at 186 with one of the drag links 184 (FIG. 4).

Figure 5:
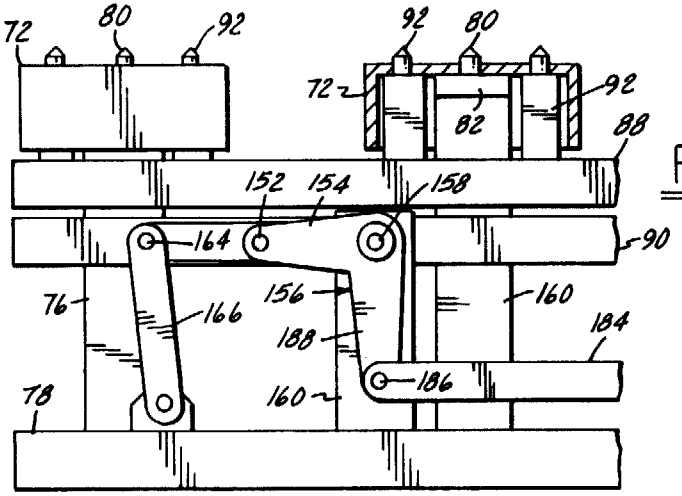
FIG. 5 is a fragmentary side view of the conveyor with the shuttle shown in the partially raised position to engage workpieces received on locators in the stations of the conveyor.
Figure 7:
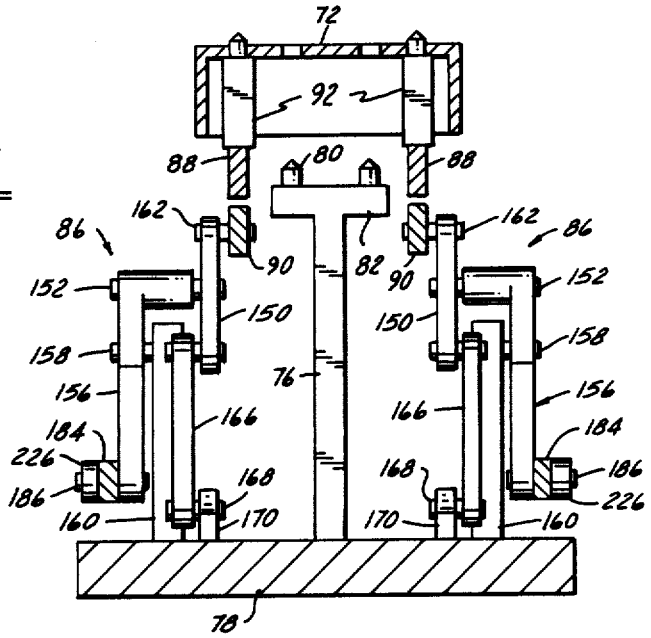
FIG. 7 is a sectional view taken generally one line 7—7 of FIG. 4 and illustrating some of the component parts of the lifts.

With the lifts 86 and hence the shuttle 84 in the fully lowered position, as shown in FIG. 6, when the crank 202 of the cycloidal drive 190 is rotated one revolution counter-clockwise (as viewed in FIG. 17), the rack 192 is moved to the left which simultaneously actuates all the lifts 86 in synchronization to raise the shuttle to the position shown in FIG. 5 where its locators 92 engage all of the workpieces 72 resting on the supports 176. A second full revolution counter-clockwise of the crank 202 again simultaneously actuates all of the lifts 86 in unison to move the shuttle 84 generally vertically upward to the fully raised position shown in FIG. 4 which lifts all the workpieces 72 off the supports 76 and locators 80 sufficiently to provide clearance therebetween, as shown in FIG. 7.

The shuttle is then indexed to advance all of the workpieces one work station. Then, the crank 202 is rotated clockwise one revolution by the drive 190 to lower the shuttle and the workpieces to the position shown in FIG. 5 so that the workpieces are deposited on the supports 76. Rotation of the crank 202 another full revolution clockwise returns the shuttle to the fully lowered position shown in FIG. 6 so that the locators 92 disengage and clear the workpieces. When in this fully lowered position, the workpiece carrier rails 88 of the shuttle are retracted to complete the transfer cycle of the conveyor.

The cycloidal drive 190 is disclosed and claimed in Brems U.S. Pat. No. 3,789,676 issued on Feb. 5, 1974, the disclosure of which is incorporated herein by reference, and hence this drive will not be described in further detail. Other embodiments of this cycloidal drive can also be used to power the lifts 86 to provide a two-step movement of the shuttle.

Figure 20:
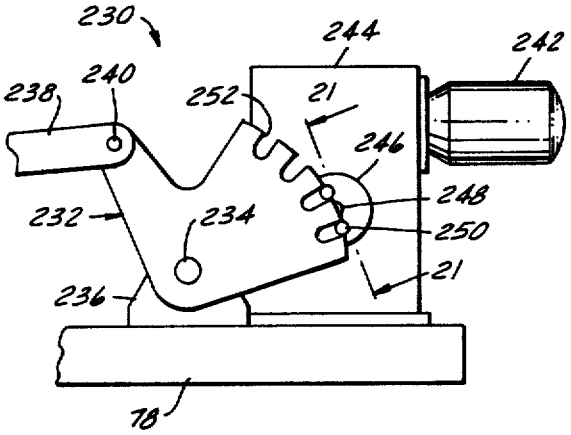
FIG. 20 is a fragmentary side view of another drive for the lifts.
Figure 21:
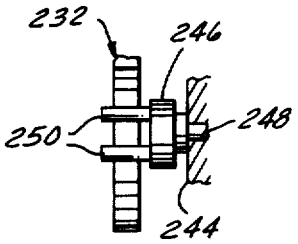
FIG. 21 is a fragmentary sectional view taken generally on line 20—20 of FIG. 21.

Another drive 230 for the lifts is shown in FIG. 20. This drive has a Geneva sector 232 pivotally mounted at 234 on a support bracket 236 fixed to the base 78. The Geneva sector is operably connected to the lifts 86 by a link 238 pivotally connected adjacent one end at 240 to the Geneva sector and pivotally connected adjacent the other end to the lever 214 of FIG. 19. The sector 232 is driven by a reversible electric motor 242 through a speed reducer gear box 244 with a disc 246 fixed to its output shaft 248. As shown in FIGS. 20 and 21, two concentric pins or cams 250 are fixed in diametrically opposed relation on the disc and engage in complementary follower slots 252 in the sector 232. When the disc is rotated at a constant speed by the motor, the cam pins 250 cooperate with the slots 252 to move the sector 232 in discrete angular increments, each with a harmonic motion and a momentary dwell.

The sector 232 will be moved through one discrete angular increment for each one-half revolution of the disc 246, which is rotated in one direction to raise the elevator (clockwise as viewed in FIG. 20), and in the opposite direction to lower the elevator (counter-clockwise as viewed in FIG. 20). Thus, clockwise rotation of the disc for one-half revolution will power the lifts 86 to raise the shuttle from the fully lowered position shown in FIG. 6 to the partially raised position shown in FIG. 5 where the shuttle 84 engages the workpieces 72 resting on the supports 76. A second clockwise rotation of the discs for half a revolution will power the lifts to move the shuttle and the workpieces thereon to the fully raised position shown in FIG. 4. The rails 88 of the shuttle are extended to advance the workpieces. Thereafter, counter-clockwise rotation of the disc for half a revolution lowers the shuttle and the workpieces to the position shown in FIG. 5 so the advanced workpieces again rest on the supports. Another counter-clockwise rotation of the disc for half a revolution turns the shuttle to the fully lowered position shown in FIG. 6. The shuttle is then retracted to complete the transfer cycle of the conveyor.

In operation of the conveyor 70, initially the shuttle 84 is fully retracted and the drives 86 and shuttle fully lowered as shown in FIG. 6. The drive 190 or 230 is energized to move the drag links 184 to the left as viewed in FIGS. 4–6 which simultaneously rotates all the bell cranks 156 clockwise to cause the lifts 86 to move in synchronization to raise the shuttle generally vertical upward to the position shown in FIG. 5 where the locators 92 on the shuttle engage the workpieces 72 resting on the supports 76. The drive 190 or 230 is energized to further raise the shuttle 84 generally vertically upward to its fully raised position shown in FIG. 4 which lifts the workpieces 72 off the supports and raises them sufficiently to clear the supports 76 and locators 80. In the fully raised position, the carriers of the shuttle are extended to index or advance each workpiece over another work station by energizing the motor 132 to rotate the drive 112 clockwise as viewed in FIG. 4. With the shuttle extended, it is again lowered to the intermediate position to deposit the workpieces on the supports 76 by energizing the drive 190 or 230 in the reverse direction to simultaneously rotate all the bell cranks 256 counter-clockwise. After the workpieces are deposited on the supports, the extended shuttle is again returned to the fully lowered position by energizing the drive 190 or 230 to simultaneously rotate all the bell cranks 156 further counter-clockwise. After the extended shuttle is returned to the fully lowered position so that it clears the workpieces, it is retracted by energizing the motor 132 in the reverse direction to rotate the drive 112 counter-clockwise. After the shuttle is fully retracted, the conveyor is again ready to commence another cycle to advance the workpieces by lifting them generally vertically, advancing them generally horizontally and then lowering the workpieces into another work station.

I claim:

1. A multiple station workpiece transfer comprising; a plurality of longitudinally spaced apart fixed stations having workpiece supports constructed and arranged to receive and support workpieces, a shuttle having a generally horizontally reciprocable workpiece carrier constructed and arranged to underlie the workpieces and to be movable generally horizontally to extended and retracted positions relative to said stations, at least two longitudinally spaced apart lifts disposed adjacent each laterally spaced apart side of said shuttle and all of said lifts being disposed laterally outside of said shuttle and constructed and arranged to generally vertically raise said shuttle to a first position wherein the workpieces are received on said carrier and disengaged from and raised sufficiently above said supports to clear them when said carrier is extended generally horizontally to advance the workpieces carried thereby relative to the stations and to generally vertically lower said shuttle to a second position wherein the workpieces are received on said supports and the shuttle carrier is disengaged from and lowered sufficiently below the workpieces to clear them when said shuttle carrier is moved generally horizontally to retract it with respect to the stations, each said lift comprising a mechanism having a displaceable fulcrum, a long link pivotally carried by said fulcrum and pivotally connected to said shuttle at a first distance from the point at which said long link is pivotally carried by said fulcrum, said fulcrum being disposed such that said long link extends generally horizontally when said shuttle is half way between said first and second positions, a pivot fixed with respect to the stations, a short link pivotally carried by said fixed pivot and being pivotally connected to said long link at a point which is a second distance from said fixed pivot and a third distance from said pivotal connection of said long link to said shuttle, said second and third distances each being at least substantially equal to one-half said first distance, said fixed pivot being disposed immediately adjacent the generally vertical path of travel of said pivotal connection of said long link to said shuttle and adjacent the midpoint of such vertical path between said first and second positions of said shuttle such that when said shuttle is in said first position said pivotal connection thereof with said long link is above said fixed pivot and when said shuttle is in said second position said pivotal connection thereof with said long link is below said fixed pivot, and a drive means operably connected to the short links of all of said lifts to rotate said short link of each lift on its associated fixed pivot and constructed and arranged to simultaneously actuate all of said lifts in unison to generally vertically raise and lower said shuttle.

2. The transfer of claim 1 wherein said fulcrum comprises a second pivot fixed relative to the stations and a support link pivotally carried by said second fixed pivot and pivotally connected to said long link at the point at which said long link is pivotally carried by said fulcrum, and said second fixed pivot is spaced a fourth distance from and generally below said pivotal connection of said support link with said long link such that when said shuttle is moved by said lift between said first and second positions, said support link extends generally vertically and oscillates about said second fixed pivot.

3. The transfer of claim 2 wherein said fourth distance is greater than one-half of said first distance and said second fixed pivot is disposed so that said support link oscillates about said second fixed pivot a substantially equal angular increment on both sides of a reference line extending vertically and intersecting the axis of said second fixed pivot when said lift moves said shuttle from said first position to said second position.

4. The transfer of claim 1 wherein said fulcrum comprises a follower connected to said long link adjacent the point said long link is pivotally carried by said fulcrum, guide means constructed and arranged to support and guide such follower such that said point at which said long link is pivotally carried by said fulcrum will move along a straight line path when said lift is actuated to move said shuttle between said first and second positions, and said guide means being fixed with respect to said fixed pivot such that said straight line path intersects the axis of said fixed pivot.

5. The transfer of claim 1 wherein said drive means comprises a bell crank for each lift, said bell crank being received on said fixed pivot and having two arms at substantially a right angle to each other, one of said arms being said short link, and the other of said arms of all of said bell cranks on each side of said shuttle being pivotally connected together by at least one drag link such that movement of all of the drag links in unison in one direction causes all of said lifts to simultaneously generally vertically raise said shuttle and movement of all of the drag links in a generally opposite direction causes all of said lifts to simultaneously generally vertically lower said shuttle.

6. The transfer of claim 5 wherein said drive means also comprises a cycloidal drive operably connected to all of said drag links.

7. The transfer of claim 5 wherein said drive means also comprises a Geneva drive operably connected to all of said drag links.

8. A multiple station workpiece transfer comprising: a plurality of longitudinally spaced apart fixed stations having workpiece supports constructed and arranged to receive and support workpieces thereon, a pair of laterally spaced apart and longitudinally extending workpiece carrier rails constructed and arranged to underlie the workpieces, guide means on which said rails are received and supported for generally horizontal reciprocation to extended and retracted positions with respect to said guide means, at least two longitudinally spaced apart lifts disposed adjacent each rail of said pair of rails with all of said lifts disposed laterally outside of said pair of rails and constructed and arranged to move generally vertically said guide means and hence said rails to a first position wherein said rails lift the workpieces above said stations sufficiently to clear them and to a second position below said stations sufficiently so that said workpieces are deposited on said supports and said rails clear the deposited workpieces, each said lift comprising a mechanism having a displaceable fulcrum, a long link pivoted on said fulcrum and pivotally connected to said guide means at a first distance from said pivot point on said fulcrum, said pivot point of said fulcrum being disposed such that said long link extends generally horizontally when said rails are half way between their first and second positions, a pivot fixed with respect to said stations, a short link pivotally carried by said fixed pivot and pivotally connected to said long link at a second distance from said fixed pivot and a third distance from said pivotal connection of said long link with said guide means, each of said second and third distances being at least substantially equal to one-half of said first distance, the axis of said fixed pivot at least substantially intersecting the generally vertical path of travel of said pivotal connection of said long link to said guide means at substantially the midpoint of its travel between said first and second positions of said rails such that when said rails are in said first position such pivotal connection of said guide means and long link is above said fixed pivot and when said rails are in said second position said pivotal connection between said guide means and long link is below said fixed pivot and said rails lie between all of said lifts, and drive means operably connected to the short links of all of said lifts to rotate said short link of each lift on its said fixed pivot and constructed and arranged to simultaneously actuate all of said lifts in unison to generally raise and lower said rails and guide means.

9. The transfer of claim 8 wherein said fulcrum comprises a second pivot fixed relative to the stations, and a support link pivotally carried by said second fixed pivot and pivotally connected to said long link at its said pivot point on said fulcrum, and said second fixed pivot is disposed so that the support link extends generally vertically and oscillates about said second fixed pivot when said lifts move said rails to said first and second positions thereof.

10. The transfer of claim 8 wherein said fulcrum comprises a follower connected to said long link adjacent the point said long link is pivotally carried by said fulcrum, guide means constructed and arranged to support and guide such follower such that said point at which said long link is pivotally carried by said fulcrum will move along a straight line path when said lift is actuated to move said rails between said first and second positions, and said guide means being fixed with respect to said fixed pivot such that said straight line path intersects the axis of said fixed pivot.

11. The transfer of claim 8 wherein said drive means comprises a bell crank for each lift, said bell crank being received on said fixed pivot and having two arms at substantially a right angle to each other, one of said arms being said short link, and the other of said arms of all of said bell cranks on each side of said shuttle being pivotally connected together by at least one drag link such that movement of all of the drag links in unison in one direction causes all of said lifts to simultaneously generally vertically raise said rails and movement of all of the drag links in a generally opposite direction causes all of said lifts to simultaneously generally vertically lower said rails.

*12. A multiple station workpiece transfer comprising: a plurality of longitudinally spaced apart fixed stations having workpiece supports constructed and arranged to receive and support workpieces, a shuttle having a generally horizontally reciprocable workpiece carrier constructed and arranged to underlie the workpieces and to be movable generally horizontally to extended and retracted positions relative to said stations, shuttle lifting means constructed and arranged to generally vertically raise said shuttle to a first position wherein the workpieces are received on said carrier and disengaged from and raised sufficiently above said supports to clear them when said carrier is extended generally horizontally to advance the workpieces carried thereby relative to the stations and to generally vertically lower said shuttle to a second position wherein the workpieces are received on said supports and the said carrier is disengaged from and lowered sufficiently below the workpieces to clear them when said carrier is moved generally horizontally to retract it with respect to the stations, said shuttle lifting means comprising longitudinally spaced apart lifts disposed adjacent to said shuttle, each said lift comprising a mechanism having a displaceable fulcrum, a long link pivotally carried by said fulcrum and pivotally connected to said shuttle at a first distance from the point at which said long link is pivotally carried by said fulcrum, said fulcrum being disposed such that said long link extends generally horizontally when said shuttle is half way between said first and second positions, a pivot fixed with respect to the stations, a short link pivotally carried by said fixed pivot and being pivotally connected to said long link at a point which is a second distance from said fixed pivot and a third distance from said pivotal connection of said long link to said shuttle, said second and third distances each being at least substantially equal to one-half said first distance, said fixed pivot being disposed immediately adjacent the generally vertical path of travel of said pivotal connection of said long link to said shuttle and adjacent the midpoint of such vertical path between said first and second positions of said shuttle such that when said shuttle is in said first position said pivotal connection thereof with said long link is above said fixed pivot and when said shuttle is in said second position said pivotal connection thereof with said long link is below said fixed pivot, and a drive means operably connected to the short links of all of said lifts to rotate said short link of each lift on its associated fixed pivot and constructed and arranged to simultaneously actuate all of said lifts in unison to generally vertically raise and lower said shuttle.*

*13. The transfer of claim 12 wherein said carrier is above said fixed pivots when said shuttle is raised to said first position and is below said fixed pivots when said shuttle is lowered to said second position.*

*14. The transfer of claim 13 wherein said fulcrum comprises a second pivot fixed relative to the stations and a support link pivotally carried by said second fixed pivot and pivotally connected to said long link at the point at which said long link is pivotally carried by said fulcrum, and said second fixed pivot is spaced a fourth distance from and generally below said pivotal connection of said support link with said long link such that when said shuttle is moved by said lift between said first and second positions, said support link extends generally vertically and oscillates about said second fixed pivot.*

*15. The transfer of claim 14 wherein said fourth distance is greater than one-half of said first distance and said second fixed pivot is disposed so that said support link oscillates about said second fixed pivot a substantially equal angular increment on both sides of a reference line extending vertically and intersecting the axis of said second fixed pivot when said lift moves said shuttle from said first position to said second position.*

*16. The transfer of claim 13 wherein said fulcrum comprises a follower connected to said long link adjacent the point said long link is pivotally carried by said fulcrum, guide means constructed and arranged to support and guide such follower such that said point at which said long link is pivotally carried by said fulcrum will move along a straight line path when said lift is actuated to move said shuttle between said first and second positions, and said guide means being fixed with respect to said fixed pivot such that said straight line path intersects the axis of said fixed pivot.*

*17. The transfer of claim 13 wherein said drive means comprises a bell crank for each lift, said bell crank being received on said fixed pivot and having two arms at substantially a right angle to each other, one of said arms being said short link, and the other of said arms of all of said bell cranks being pivotally connected together by at least one drag link such that movement of all of the drag links in unison in one direction causes all of said lifts to simultaneously generally vertically raise said shuttle and movement of all of the drag links in a generally opposite direction causes all of said lifts to simultaneously generally vertically lower said shuttle.*

*18. The transfer of claim 17 wherein said drive means also comprises a cycloidal drive operably connected to all of said drag links.*

*19. The transfer of claim 17 wherein said drive means also comprises a Geneva drive operably connected to all of said drag links.*

*20. A multiple station workpiece transfer comprising: a plurality of longitudinally spaced apart fixed stations having workpiece supports constructed and arranged to receive and support workpieces thereon, a shuttle comprising a pair of laterally spaced apart and longitudinally extending workpiece carrier rails constructed and arranged to underlie the workpieces, guide means on which said rails are received and supported for generally horizontal reciprocation to extended and retracted positions with respect to said guide means, shuttle lifting means constructed and arranged to move generally vertically said guide means and hence said rails to a first position wherein said rails lift the workpieces above said stations sufficiently to clear them and to a second position below said stations sufficiently so that said workpieces are deposited on said supports and said rails clear the deposited workpieces, said shuttle lifting means comprising longitudinally spaced apart lifts disposed adjacent said rails, each said lift comprising a mechanism having a displaceable fulcrum, a long link pivoted on said fulcrum and pivotally connected to said guide means at a first distance from said pivot point on said fulcrum, said pivot point of said fulcrum being disposed such that said long link extends generally horizontally when said rails are half way between their first and second positions, a pivot fixed with respect to said stations, a short link pivotally carried by said fixed pivot and pivotally connected to said long link at a second distance from said fixed pivot and a third distance from said pivotal connection of said long link with said guide means, each of said second and third distances being at least substantially equal to one-half of said first distance, the axis of said fixed pivot at least substantially intersecting the generally vertical path of travel of said pivotal connection of said long link to said guide means at substantially the midpoint of its travel between said first and second positions of said rails such that when said rails are in said first position such pivotal connection of said guide means and long link is above said fixed pivot and when said rails are in said second position said pivotal connection between said guide means and long link is below said fixed pivot, and drive means operably connected to the short links of all of said lifts to rotate said short link of each lift on its said fixed pivot and constructed and arranged to simultaneously actuate all of said lifts in unison to generally raise and lower said rails and guide means.*

*21. The transfer of claim 20 wherein said rails when raised to said first position are above said fixed pivots and when lowered to said second position are below said fixed pivots.*

*22. The transfer of claim 21 wherein said fulcrum comprises a second pivot fixed relative to the stations and a support link pivotally carried by said second fixed pivot and pivotally connected to said long link at the point at which said long link is pivotally carried by said fulcrum, and said second fixed pivot is spaced a fourth distance from and generally below said pivotal connection of said support link with said long link such that when said shuttle is moved by said lift between said first and second positions, said support link extends generally vertically and oscillates about said second fixed pivot.*

*23. The transfer of claim 22 wherein said fourth distance is greater than one-half of said first distance and said second fixed pivot is disposed so that said support link oscillates about said second fixed pivot a substantially equal angular increment on both sides of a reference line extending vertically and intersecting the axis of said second fixed pivot when said lift moves said shuttle from said first position to said second position.*

*24. The transfer of claim 21 wherein said fulcrum comprises a follower connected to said long link adjacent the point said long link is pivotally carried by said fulcrum, guide means constructed and arranged to support and guide such follower such that said point at which said long link is pivotally carried by said fulcrum will move along a straight line path when said lift is actuated to move said shuttle between said first and second positions, and said guide means being fixed with respect to said fixed pivot such that said straight line path intersects the axis of said fixed pivot.*

*25. The transfer of claim 21 wherein said drive means comprises a bell crank for each lift, said bell crank being received on said fixed pivot and having two arms at substantially a right angle to each other, one of said arms being said short link, and the other of said arms of all of said bell cranks being pivotally connected together by at least one drag link such that movement of all of the drag links in unison in one direction causes all of said lifts to simultaneously generally vertically raise said shuttle and*

*movement of all of the drag links in a generally opposite direction causes all of said lifts to simultaneously generally vertically lower said shuttle.*

*26. The transfer of claim 25 wherein said drive means also comprises a cycloidal drive operably connected to all of said drag links.*

*27. The transfer of claim 25 wherein said drive means also comprises a Geneva drive operably connected to all of said drag links.*

* * * * *